(No Model.)

R. E. LINHAM, Dec'd.
H. LINHAM, Executrix.
MOLDING CUTTER.

No. 472,677.

Patented Apr. 12, 1892.

Witnesses:

Robert E. Linham,
Inventor:
By Thomas E. Barrow,
Attorney.

UNITED STATES PATENT OFFICE.

ROBERT E. LINHAM, OF MANSFIELD, OHIO; HERMIE LINHAM, EXECUTRIX OF SAID ROBERT E. LINHAM, DECEASED, ASSIGNOR, BY MESNE ASSIGNMENTS, TO THE LINHAM DADO MACHINE COMPANY, OF SAME PLACE.

MOLDING-CUTTER.

SPECIFICATION forming part of Letters Patent No. 472,677, dated April 12, 1892.

Application filed February 14, 1890. Serial No. 340,471. (No model.)

*To all whom it may concern:*

Be it known that I, ROBERT E. LINHAM, a citizen of the United States, residing at Mansfield, in the county of Richland and State of Ohio, have invented certain new and useful Improvements in Molding-Cutters; and I do declare the following to be a full, clear, and exact description of the invention, such as will enable others skilled in the art to which it appertains to make and use the same.

My invention relates to improvements in molding-cutters, and is especially designed for use in the cutter-head for which I filed an application of even date herewith, bearing the Serial No. 340,466.

The object of the invention is the provision of a cutter which will form a V-shaped groove in the molding in line with the shank of the cutter.

The cutter may be used alone or may be used in connection with another cutter, in the latter case the cutter making a V-shaped groove in the molding and the cutter used in connection therewith rounding the groove or otherwise forming it as may be desired.

To attain the desired objects the invention consists of a cutter comprising a cylindrical shank and a V-shaped foot formed integral therewith and at an angle thereto, with the apex of the foot arranged centrally of the shank and the cutting-edge being at the remotest or outer end of the foot.

I have illustrated a molding-cutter constructed in accordance with and embodying my invention in the accompanying drawings, in which—

Figure 1:
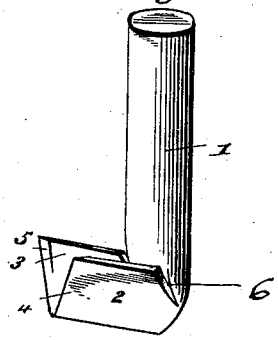
Figure 2:
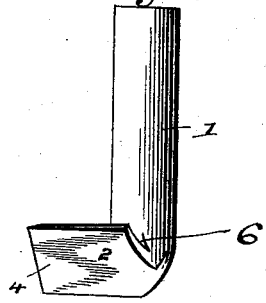

Figure 1 represents a perspective view thereof, and Fig. 2 represents a side elevation thereof.

Referring by numerals to the drawings, 1 designates the shank of my cutter, which is of cylindrical form to adapt it for use in my cutter-head, and 2 designates the integral foot. This foot is V-shaped and is arranged at an acute angle or right angle to the shank with the outer face 4 smooth, and at the forward or remotest point having a V-shaped cutting-edge 5. The apex of the V-shaped foot is arranged centrally of the shank, and by this arrangement the V-shaped groove is directly in front of the shank with the point of the groove centrally thereof. By forming the cutting-edge centrally of the shank and in line therewith the cutter may be used to form a V-shaped groove or form the path for a cutter of a different shape. The inner face 3 of the foot is smooth, and the cutting-edge 5 is formed by beveling from the inner face 3, as clearly shown. By changing the angle of the foot the edge will make a shorter or longer groove in the material. The flaring side portions of the foot or blade 2 extend away from the shank at the heels thereof to form openings or throats 6, which allow the refuse cut material to pass out and free the said foot or blade, thereby obviating choking of the cutter or foot. This construction also provides for a deeper cut with a comparatively small blade, as the said flaring side portions of the foot or blade project upward of the shank and are thereby extended in width as to the working surface.

I am aware that it is not new to have a shank formed with a foot, one side of which is inclined and the other curved, the foot being arranged at one side of the shank, and hence do not claim such construction; but What I do claim is—

The herein-described cutter or bit, comprising the shank and a foot or blade at right angles to the lower part of said shank, said foot or blade being of V-shaped form with a cutting-edge at the free extremity and having the flaring sides of the same standing away from the shank at the upper parts of their heels to form recesses or throats, for the purpose set forth.

In testimony whereof I affix my signature in the presence of two witnesses.

ROBERT E. LINHAM.

Witnesses:
ABRAHAM SMALL,
J. C. LASER.